United States Patent
Smith et al.

(10) Patent No.: US 10,856,122 B2
(45) Date of Patent: Dec. 1, 2020

(54) SYSTEM, APPARATUS AND METHOD FOR SCALABLE INTERNET OF THINGS (IOT) DEVICE ON-BOARDING WITH QUARANTINE CAPABILITIES

(71) Applicant: Intel Corporation, Santa Clara, CA (US)

(72) Inventors: Ned M. Smith, Beaverton, OR (US); Ravi S. Subramaniam, San Jose, CA (US); David W. Grawrock, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 1030 days.

(21) Appl. No.: 15/168,321

(22) Filed: May 31, 2016

(65) Prior Publication Data

US 2017/0346848 A1  Nov. 30, 2017

(51) Int. Cl.
*H04W 12/08* (2009.01)
*H04W 4/70* (2018.01)
*H04W 4/00* (2018.01)
*H04W 12/06* (2009.01)
*H04L 29/06* (2006.01)

(52) U.S. Cl.
CPC .............. *H04W 4/70* (2018.02); *H04L 63/06* (2013.01); *H04L 63/08* (2013.01); *H04L 63/1441* (2013.01); *H04W 4/00* (2013.01); *H04W 12/0609* (2019.01)

(58) Field of Classification Search
USPC .................. 726/7, 2, 21; 713/150, 163, 181; 380/255, 264, 276
See application file for complete search history.

(56) References Cited

U.S. PATENT DOCUMENTS

| | | | | |
|---|---|---|---|---|
| 2005/0172142 A1* | 8/2005 | Shelest | ................. | G06F 21/577 713/191 |
| 2005/0229004 A1* | 10/2005 | Callaghan | ............. | H04L 9/3268 713/185 |
| 2007/0118567 A1* | 5/2007 | Isokawa | ................ | H04L 63/145 |
| 2007/0150737 A1* | 6/2007 | Parupudi | ............... | H04L 9/3263 713/175 |

(Continued)

OTHER PUBLICATIONS

Certified Wireless Network Professional, "802.11i Authentication and Key Management (AKM) White Paper," May 2005, 10 pages.

(Continued)

*Primary Examiner* — Sharif E Ullah
(74) *Attorney, Agent, or Firm* — Trop, Pruner & Hu, P.C.

(57) ABSTRACT

In one embodiment, a domain controller includes: a quarantine logic to quarantine unknown devices from unrestricted network access, the quarantine logic comprising a first quarantine point at a first layer of a multi-layer communication model; a first logic to communicate with a domain name system (DNS) service to self-allocate and register a domain name with the DNS service, the domain name associated with a domain to be managed by the domain controller; a second logic to manage a group of devices of the domain; and a third logic to receive a provisioning request for a first device via an access point, wherein the access point comprises a second quarantine point at a second layer of the multi-level communication model. Other embodiments are described and claimed.

20 Claims, 8 Drawing Sheets

(56) References Cited

U.S. PATENT DOCUMENTS

| | | | | |
|---|---|---|---|---|
| 2009/0307759 | A1* | 12/2009 | Schnell | G06F 21/10 726/4 |
| 2014/0201822 | A1* | 7/2014 | Fullerton | H04L 63/10 726/4 |
| 2014/0223543 | A1* | 8/2014 | Jeansonne | G06F 21/50 726/16 |
| 2017/0111333 | A1* | 4/2017 | Smith | H04L 9/32 |
| 2017/0163616 | A1* | 6/2017 | Smith | H04L 63/062 |
| 2017/0289138 | A1* | 10/2017 | Ben-Shalom | H04L 63/065 |

OTHER PUBLICATIONS

Ernie Brickell, et al., "Enhanced Privacy ID from Bilinear Pairing," Sep. 8, 2009, 23 pages.
U.S. Appl. No. 15/088,308, filed Apr. 1, 2016, entitled "System, Apparatus and Method for First Hop Security," by Omer Ben-Shalom, et al.
Cisco, "IPv6 First-Hop Security Concerns," Cisco Press 2008, 5 pages.
U.S. Appl. No. 14/961,006, filed Dec. 7, 2015, entitled "System, Apparatus and Method for Providing Privacy Preserving Interaction With a Computing System," by Ned M. Smith, et al.
U.S. Appl. No. 14/976,165, filed Dec. 21, 2015, entitled "System, Apparatus and Method for Migrating a Device Having a Platform Group," by Ned M. Smith, et al.
International Searching Authority, "Notification of Transmittal of the International Search Report and the Written Opinion of the International Searching Authority," dated Jul. 27, 2017 in International application No. PCT/US2017/029320.

\* cited by examiner

SYSTEM, APPARATUS AND METHOD FOR SCALABLE INTERNET OF THINGS (IOT) DEVICE ON-BOARDING WITH QUARANTINE CAPABILITIES

BACKGROUND

Industry experts predict there will be between 30 and 50 billion connected Internet of Things (IoT) devices by 2020. About ⅘ths (40 B) of these smart devices connected to the Internet will be constrained devices; that is, devices with limited compute, memory, storage and/or user input/output capability such as a keyboard and display. Constrained devices nevertheless ought to be secure to ensure proper functioning of an IoT network. Consequently, methods for grouping IoT devices into collections and for on-boarding those devices into a given collection may occur. On-boarding is a process where an entity responsible for continued management and servicing of the device (a device owner) accepts this responsibility and where a previous owner grants the transfer of ownership. Current on-boarding processes are cumbersome and typically require human intervention, as in the form of an information technology (IT) professional.

DETAILED DESCRIPTION

In various embodiments, devices such as IoT devices can be on-boarded into a network by constructing quarantined network connections for unknown devices where device ownership, grouping, domain membership and provisioning operations can happen securely. More so, given the sheer number of IoT devices that are expected to come online, embodiments enable secure on-boarding to occur wirelessly and with little or no touch or other human involvement (and potentially zero human interaction). As used herein, the term "unknown device" is used to refer to a device that lacks membership in a given domain and/or ownership by a given owner entity.

Embodiments may builds on existing technology for constructing network enclaves including Institute of Electrical and Electronics Engineers (IEEE) 802.1X, Remote Authentication Dial-In User Service (RADIUS)/authentication authorization and accounting (AAA) and Domain Name System-based Authentication of Named Entities (DANE) (Request for Comments (RFC6698)) and asymmetric cryptography techniques, all of which typically occur in the context of a trusted closed network. Embodiments may extend such technology to be applicable in a wider variety of network contexts, including open networks. To this end, embodiments may enable on-boarding while protecting against attackers, such as could occur if devices are enabled to be provisioned by a first entity that comes along. For example without an embodiment, attack provisioning agents could take advantage of an unowned device by seizing control of such device soon after the device is powered on for the first time. Embodiments may further employ protocols for explicit transfer of ownership based at least in part on the concept of a digital title, effected by a record or title chain indicating ownership transfers associated with a device.

In embodiments, any given entity may assert themselves as an owner of a collection of devices, where this collection is referred to herein as a domain. As used herein, the term "domain" refers to a collection of devices having common ownership and membership within a group. Such devices may be wide variety of compute or other devices, which may have heterogeneous capabilities. The domain may or may not correspond to an Internet Protocol version 6 (IPv6) domain, in that there can be devices that do not implement an IP protocol stack, but are nevertheless considered part of the owner's collection or domain. Thus, in contrast to a conventional remediation network such as an IPv4/6 subnet that only contains a remediation server, embodiments provide a remediation network that spans multiple levels of a communication model.

Stated another way, this self-assertion of ownership of a namespace may be for a namespace that does not necessarily correspond to an IPv4/6 network address. As such, embodiments enable a namespace to be established according to a variety of schemes, not just IP addresses (e.g., URIs, Object IDs, DUNS, UUIDs or another scheme). This ensures that domain owners may self-assert a domain identifier without subjection to the established naming authority of a given network connectivity standard. In this way, owners can be shielded from having to obtain namespace rights in every network layer technology that may be contained in the various owned IoT devices, without further aligning them in some way as the domain owner spanning them.

The naming approach herein differs from the notion of a Public Key Infrastructure (PKI) Certificate Authority (CA) in that a CA necessarily establishes a trusted binding between an asymmetric key and a name (e.g. X.500 RDN or IPv4 DNS name). Instead in embodiments, a domain owner can manage association of an EPID key with an EPID group, and associate a domain name with an EPID public key hash (potentially without a certificate). A DANE service may be used to ensure all participants in a network agree on the naming convention and associated anchor values.

Devices become owned by an owner when they are provisioned with a credential issued by the owner that allows the device to assert membership in the collection. In an embodiment, an Intel® Enhanced Privacy identifier (EPID) may be used as a credential that achieves this assertion. And in an embodiment, an EPID Join protocol provides a method for provisioning group asymmetric credentials.

According to various embodiments, a quarantine network, also referred to herein as a remediation network, is used to establish a secure connection for provisioning. Although the scope of the present invention is not limited in this regard, 3 example techniques for quarantining unknown devices include: (1) IEEE 802.1X with a RADIUS/AAA server for media access control (MAC) layer isolation; (2) a DANE DNS server for IP network or transport layer isolation over a virtual private network (VPN); and (3) a trusted gateway device for isolating non-IP protocol capable devices from the owner's collection (domain).

Regardless of the particular network, all devices are quarantined by default and are released from quarantine if they can prove themselves a member of an established domain that the quarantine enforcement point recognizes and trusts. If the device cannot satisfy the proof requirement, it may request that its ownership status be transferred to the domain that is holding it in quarantine. Ownership transfer can be accomplished using a variety of techniques. One such technique is a digital device title transfer technology, which may be applied while a device is in the quarantine network, as one of the possible quarantine exit criteria. For example, a digital title transfer technique may extend an IEEE 802.1X Extensible Authentication Protocol (EAP) inner method to establish a secure channel between the device's most trusted mode of operation and the domain's most trusted service provider, namely its domain controller.

Following a change to a device title, the device is provisioned with a domain credential such as an EPID private key, where the EPID group identifies the domain or one of its sub-domains. Note that the domain namespace may be orthogonal to that of IP networks, namely there need not be a corresponding IPv4 or IPv6 network address association in order for the ownership transfer and domain membership to be accomplished. In an embodiment, an EPID Join protocol, described further below, is applied while in quarantine to provision a new (and possibly second EPID key) to the device. A first EPID key may be a manufacturer provisioned EPID key that establishes the device as a member of a manufacturer defined group, where its manufactured state and security capabilities can be securely attested. Such base attestation may occur, for example, as part of establishing a secure channel to the domain controller while in a quarantine network.

Membership in the domain authorizes the device to exit the quarantine, but before it can connect to a peer domain device it may require additional provisioning. For example, a device may be provisioned with further configuration information to learn of additional access points and VPN concentrator devices that expose additional domain resources. Provisioning of these settings may occur within the existing quarantine context, which can be re-established if the current connection is reset. Nevertheless, the member device though authorized is not able to establish a connection to a peer device until it completes domain provisioning.

In some embodiments, a device manufacturer may pre-configure devices with manufacturer credentials that establish initial trust in the device. Understand that manufacturer credentials do not automatically establish the domain owner unless there is a business agreement in place whereby the manufacturer agrees to pre-provision the intended owner's domain credential and settings.

In some embodiments, trust may be established for a domain through an Internet block chain, such as a Bitcoin block chain, where a transaction involving the domain owner may identify an EPID public key, where a key anchor may be supplied to a DANE server. Association of the EPID anchor with a block chain entry ensures that there is a consensus of block chain processors that agree regarding the association and where the work required by an attacker to reverse that assertion is significant. Hence, a self-asserted domain identity as described herein may be more trustworthy than any existing CA.

Figure 1:
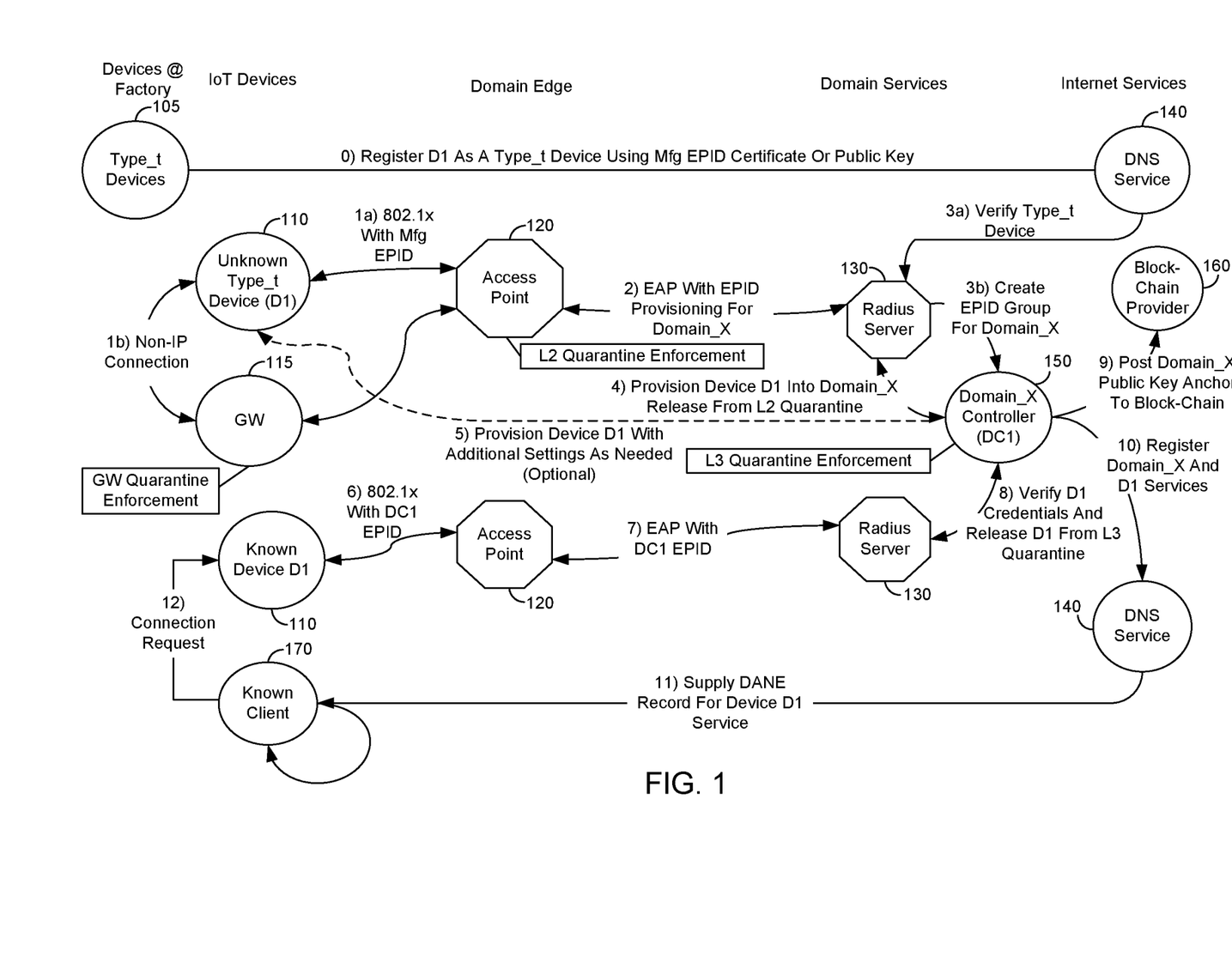
FIG. 1 is a block diagram of an overview of a networked system in accordance with an embodiment of the present invention.

Referring now to FIG. 1, shown is a block diagram of an overview of a networked system in accordance with an embodiment of the present invention. More specifically, network 100 is shown at a high level of abstraction, in that devices at a wide variety of locations and states can interact. Certain devices, such as IoT devices, can be automatically and dynamically provisioned for on-boarding into a given domain. Further in network 100 known devices can be authenticated to enable their interaction within the network.

More specifically as shown in FIG. 1, a set of devices 105 are present, which may be manufactured IoT devices. In some cases, devices 105 may be in a manufactured state as individual components, such as integrated circuits or other semiconductor devices to be integrated into a downstream IoT device. In other cases devices 105 may be IoT devices themselves, such as relatively low compute complexity devices. Such examples of IoT devices include wearable devices, sensors, actuators or other small form factor devices. In any event, devices 105 may be devices of a given type (e.g., having a particular configuration) and identified as a given type of device (e.g., type_T) by a manufacturer. To this end, such devices may communicate with another layer of the network, namely a domain name system (DNS) service 140, which may be one or more server computers such as DANE servers configured to perform DNS services. This communication, represented at time instance 0 may occur after manufacture but before devices 105 leave a manufacturing facility, to enable devices 105 to be registered as a device of a particular type (as stored in association with DNS service 140). In this unregistered state, understand that devices 105 may include some type of certificate or public key, such as a manufacturer EPID certificate or public key to indicate the status of these devices as being of a particular type. Note however that in this unregistered and unowned state, the devices do not otherwise have an identifier or association with any particular domain.

In FIG. 1, an unknown IoT device 110 is being on-boarded into an IoT network (Domain_X) using an EPID-based domain credential. Understand also that a known device's group membership is re-evaluated each time it connects to a network. This approach supports both industrial IoT and consumer IoT scenarios. In embodiments, a domain controller 150 manages membership in a group of IoT devices that may be independent of the IP network naming infrastructure.

A device that was newly manufactured is considered unknown to the domain controller because it has not yet been provisioned with a domain credential. Nevertheless it contains a manufacturer provisioned credential containing an EPID private key that is used to establish the device type, manufacturer and security attributes. The EPID key is used to form a secure channel between domain controller 150 and device 110 over which a different EPID key (group key) is provisioned; one that establishes device 110 a member of the domain (domain controller defined group). Domain controller 150 further establishes and registers its self-asserted domain name with a DANE service provider 140. It uses the EPID public key, anchor hash or certificate to associate the domain key with domain identity. Sub-division of devices within a domain collection can also be facilitated. Domain controller 150 may provide a sub-domain name according to the type of identifier use (e.g., URI, Object ID) or may create a different basis for sub-domain (e.g., UUID_Domain_X-

.UUID_Subdomain). Domain controller 150 registers itself as the domain controller for handling device ownership transfer, on-boarding and provisioning requests for the given domain. It also registers each device in the collection and the service type (or function) the device performs. DNS service 140 then may be contacted by other devices desiring to connect with device 110. By way of this contact, an IP address of the device is resolved, and further an identity of which domain the device is a member and that it is authorized to perform a device function (namely that of type_t).

DNS service 140 may be configured to maintain a registry of active domains/sub-domains and the domain controller, access point and gateway devices that may be contacted whenever a connection is attempted by an IoT device. DNS service 140 may be configured to ensure the group membership(s) can be verified according to the intent of domain controller 150. If membership status cannot be verified, a device may be prevented from connecting to the domain (either via a L2, L3, L4 or gateway enforcement point).

As illustrated, at a later time (time instances 1*a* and/or 1*b*) a given unknown IoT device 110 may seek to communicate within a given network sub-portion. More specifically as shown, unknown IoT device 110 may seek to communicate with an access point 120 and/or a gateway device 115. In embodiments, unknown device 110 may communicate with access point 120 via gateway device 115, when unknown device 110 does not have sufficient resources for direct communication with access point 120. Such situation may adhere when unknown device 110 is not an Internet protocol (IP)-capable communication device. As examples, where unknown device 110 is configured to communicate strictly via a given local wireless area network connection such as a Bluetooth (e.g., Bluetooth low energy) communication protocol or a near field communication (NFC) technique, gateway device 115 may act as an intermediary between unknown device 110 and access point 120. For example, a gateway device may be a mobile terminal or other portable computing device. In some cases, such gateway device may include a processor having an Intel® Active Management Technology (AMT) to perform protocol gateway functions on a manageability engine (which may be part of the processor or a separate co-processor in different embodiments). In various embodiments, access point 120 may be an IEEE 802.1x access point, a wireless access point, or other local area network access point.

In the illustrated embodiment, note that both gateway device 115 and access point 120 are configured to be quarantine points of a remediation network. More specifically, a remediation network may provide for a quarantine of unknown or unauthorized devices at multiple layers of a multi-level communication model, such as an International Standards Organization (ISO)-Open Systems Interconnection (OSI) model (e.g., the well-known seven layer OSI model). In the specific embodiment shown, gateway device 115 may act at a gateway quarantine point, while access point 120 may act at a Layer 2 (L2) or data link layer of the communication model. In this arrangement, a Layer 1 (L1) is a physical layer followed by a data link layer (L2) followed by 5 additional layers ending with an application layer (L7) at the "top." Hence, the industry generally regards lower layers as being more primitive and higher layers being more end-to end and semantically rich.

A multi-layer remediation network as described herein may be configured to assert the tightest (most constrictive) case being assertable at the low layer (e.g., physical). In fact, the device itself could have physical isolation properties such as an IO controller, manageability controller or security controller that may contain an even more tightly constrained property within the physical later. In general in embodiments herein, an unknown device may be placed in the most constrained environment possible and then allowed release for concentric circles of constraint progressing up the communication stack (e.g., from L1 to L7).

Still referring to FIG. 1, access point 120 communicates with a RADIUS server 130 to perform provisioning with regard to unknown device 110 for provisioning into a particular domain. In an embodiment, such provisioning communications may be in accordance with an EAP protocol, e.g., using the manufacturer EPID key. In turn, RADIUS server 130 may be in communication with DNS service 140 (at time instance 3*a*) to verify that unknown device 110 is of a given device type (here a type_T device).

As further illustrated, at time instance 3*b*, RADIUS server 130 may be in communication with domain controller 150. In embodiments, domain controller 150 may act as a manager for a given domain to manage group membership into such domain. As further illustrated, domain controller 150 may be a quarantine enforcement point at yet another layer of the communication protocol. More specifically, domain controller 150 may be at a Layer 3 (L3) or network layer of the communication model.

Interaction between domain controller 150 and RADIUS server 130 may result in provisioning device 110 into a given domain (here domain_X). When such provisioning is realized, domain controller 150 may indicate the same to RADIUS server, to in turn enable unknown device 110 to be removed from the L2 quarantine point.

At this point (time instance 5), direct communication may occur between device 110 and domain controller 150 (in some cases, while this communication is direct, it may be intermediated by access point 120. This provisioning of device 110 into a given domain provides various configuration settings and other information such as credentials into device 110 to enable it to be updated to be a known device state, such as an owned device, meaning that it is to be controlled by way of domain controller 150. To this end, various communications may occur (such as at time instances 6 and 7) to enable authentication protocols to occur between known device 110 and access point 120 and RADIUS server 130 such that known device 110 can be on-boarded into the domain. At this point, as illustrated at time instance 8, the credentials for device 110 are verified by domain controller 150 such that the device may be released from the L3 enforcement point. Note that in some embodiments, additional provisioned material may be provided to device 110, such as different IEEE 802.11i password settings to connect to other instances of access point 120. If device 110 is to be permitted to exchange information with a known client 170, credentials for client 170 may be provisioned. In addition, there can be access control lists, certificates, authorization privileges, roles, etc. Other device management and configuration may occur including software update, installation of security monitoring, intrusion detection, antivirus scans, or so forth. Furthermore device 110 could be assigned to a sub-group or zone or domain as a way to establish locality of control and administration.

Still referring to FIG. 1, note that at least by time instance 9 (which may occur prior to any of the other activities shown in FIG. 1 in some cases), domain controller 150 may establish a domain name for the domain and provide it to a block chain provider 160. Block chain provider 160 may be implemented as one or more server computers to provide block chain ledger activities with regard to protected domains. In an embodiment, this communication with block chain provider 160 may include posting of a public key anchor to a given block chain maintained by block chain provider 160.

At time instance 10 (which again may occur prior to any of the other activities shown in FIG. 1 (with the exception of posting of the anchor to the block chain provider)), the domain and services available by known device 110 may be registered with DNS service 140. As such, DNS service 140 may supply, responsive to a request from other known clients, such as known client 170, a domain record for known device 110. As such, at time instance 12, a connection request may be issued from known client 170 to known device 110, responsive to verification within known device 110, based on the record provided by DNS server 140, that D1 is a given domain IoT device of a particular type. Thereafter, these devices may communicate and/or perform negotiation for further secure operations. As one example, known device 110 may sign a message with its group private key (e.g., domain-based EPID private key), and known device 170 may validate the message using the domain EPID public key. Understand while shown at this high level in the embodiment of FIG. 1, many variations and alternatives are possible.

As illustrated in FIG. 1, the L2-L4 enforcement points along with gateway device 115 implement the quarantine capability at multiple layers. The GW quarantine device is a way for non-IP protocol devices to be quarantined. In such embodiments, network access control (NAC) features may be used as an enforcement point for the non-IP protocol device.

Figure 2:
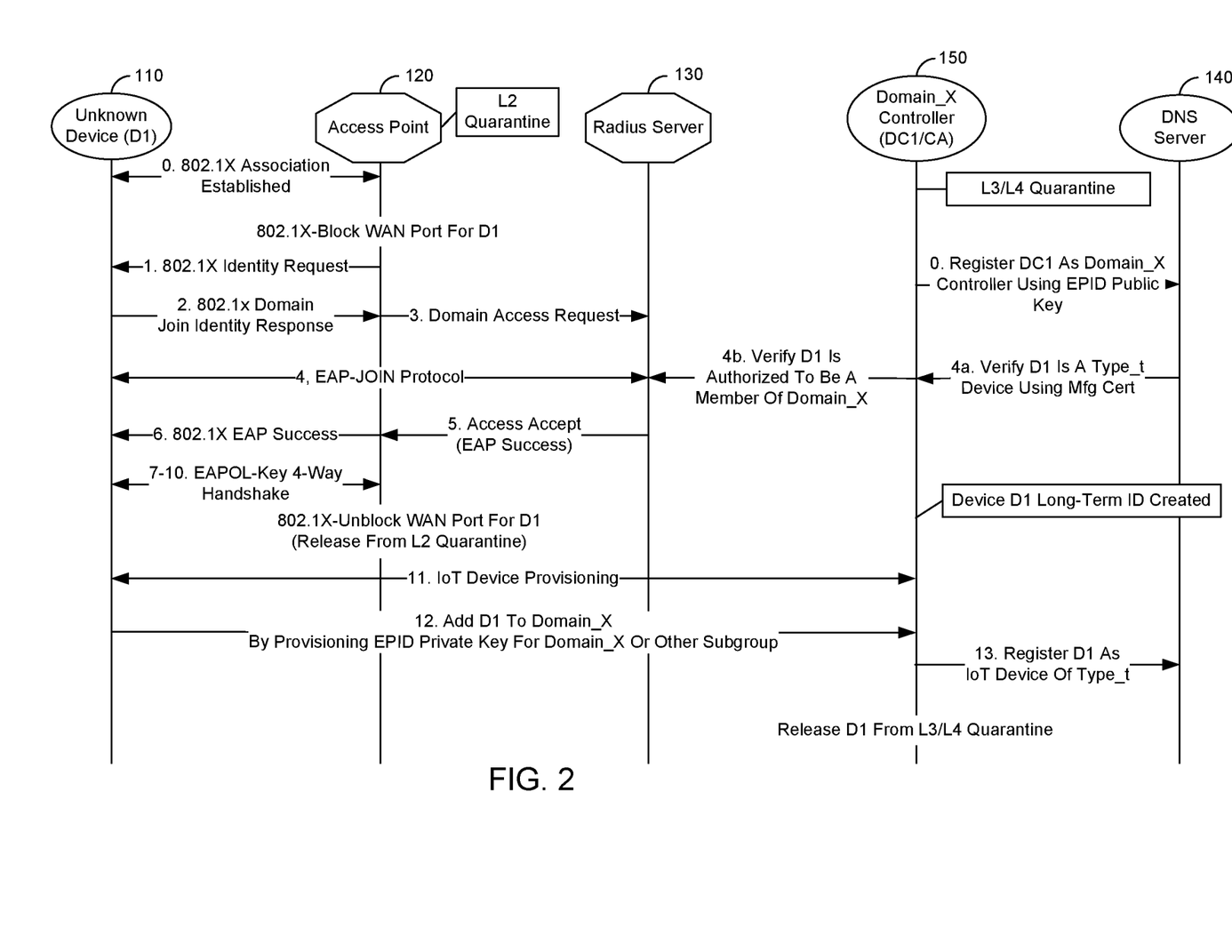
FIG. 2 is a block diagram of a detailed industrial IoT device on-boarding scenario in accordance with one embodiment of the present invention.

Referring now to FIG. 2, shown is a block diagram of a detailed industrial IoT device on-boarding scenario in accordance with one embodiment of the present invention. The device may use a manufacturer issued certificate to establish device trust while in the L2 quarantine. The device may be further provisioned and admitted into the domain by being issued a Domain_X credential based on an EPID key. The device ID and services it provides may be established by domain controller 150 who also registers the Domain_X credential and service type with a DANE service. Device 110 is released from the L3 quarantine upon success. Release from quarantine means the DANE registration is completed and domain controller 150 maintains a list of member devices that are quarantined. A domain controller may deny L3 access by other domain member clients should a connection be attempted with a given device.

As shown in FIG. 2, as preamble activities, domain controller 150 may register as a domain controller using a public key for the domain (such as an EPID public key) with DNS server 140. In addition, an association may be established between unknown device 110 and access point 120, which acts as an L2 enforcement point. Responsive to this establishment, a wide area network (WAN) port for the device may be blocked by access point 120.

Thereafter, responsive to an identity request from access point 120, unknown device 110 may issue a domain join identity response that in turn causes access point 120 to issue a domain access request to radius server 130. In turn, an EAP-Join protocol may be performed which may use a manufacturer EPID certificate of unknown device 110 to attest to its origin. As such, at time instances 4a and 4b, this device may be verified as being of the appropriate device type based on this manufacturer certificate and verify that the device is authorized to be a member of the domain.

Still referring to FIG. 2, this results in an EAP success, communicated back to device 110, which causes initiation of an EAPOL key four-way handshake to occur between unknown device 110 and access point 120, resulting from the device being released from the L2 quarantine. At this point, IoT device provisioning may occur between device 110 and domain controller 150, including establishment of a long term ID created for the device. Thereafter operations may be performed to add this device to the domain by provisioning an EPID private key for the domain or a given sub-group of the domain. Finally, responsive to this provisioning, the device may be registered as a IoT device of the given type with DNS server 140, after which the device may be released from the L3/L4 quarantine.

Figure 3:
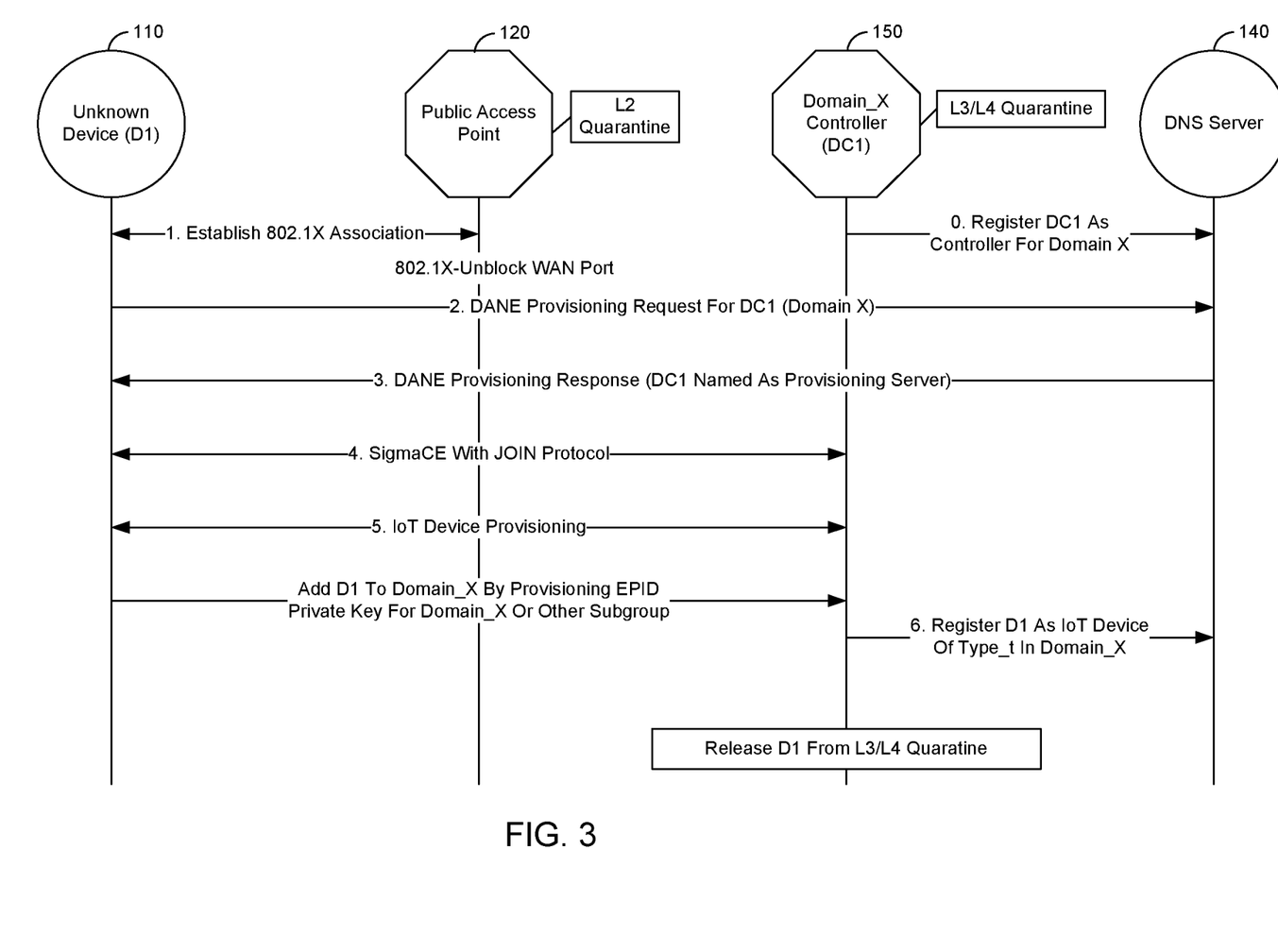
FIG. 3 is a block diagram showing a detailed method for a consumer IoT device on-boarding scenario in accordance with one embodiment of the present invention.

FIG. 3 is a block diagram showing a detailed method for a consumer IoT on-boarding scenario. In this embedment, a layer 3 quarantine is provided, and a DANE DNS service vectors the unknown device to the appropriate Domain X controller that performs domain provisioning and may subsequently release D1 from the L3 quarantine.

As illustrated in FIG. 3, in this embodiment, the same preparatory actions with regard to 802.1x association (which may be by way of four-way handshake) and domain controller registration occur. Thereafter, the WAN port for unknown device 110 may be blocked, such that the DANE provisioning request for the domain can be sent using the manufacturer EPID certificate to establish trust. In turn, the response from the DNS server 140 names domain controller 150 as the provisioning server. As seen, a given protocol, such as an Intel® Sigma CE with an EPID Join protocol may be used to establish trust, using the same EPID manufacturer certificate. Thereafter, IoT device provisioning may occur between these devices, e.g., using a constrained authentication protocol (CoAP). During this provisioning, a long term ID can be created for the device. This provisioning concludes by adding device 110 to the domain by provisioning an EPID private key for the domain or other sub-group. After registration of the device with DNS server 140, the device may be released from the L3/L4 quarantine.

Figure 4:
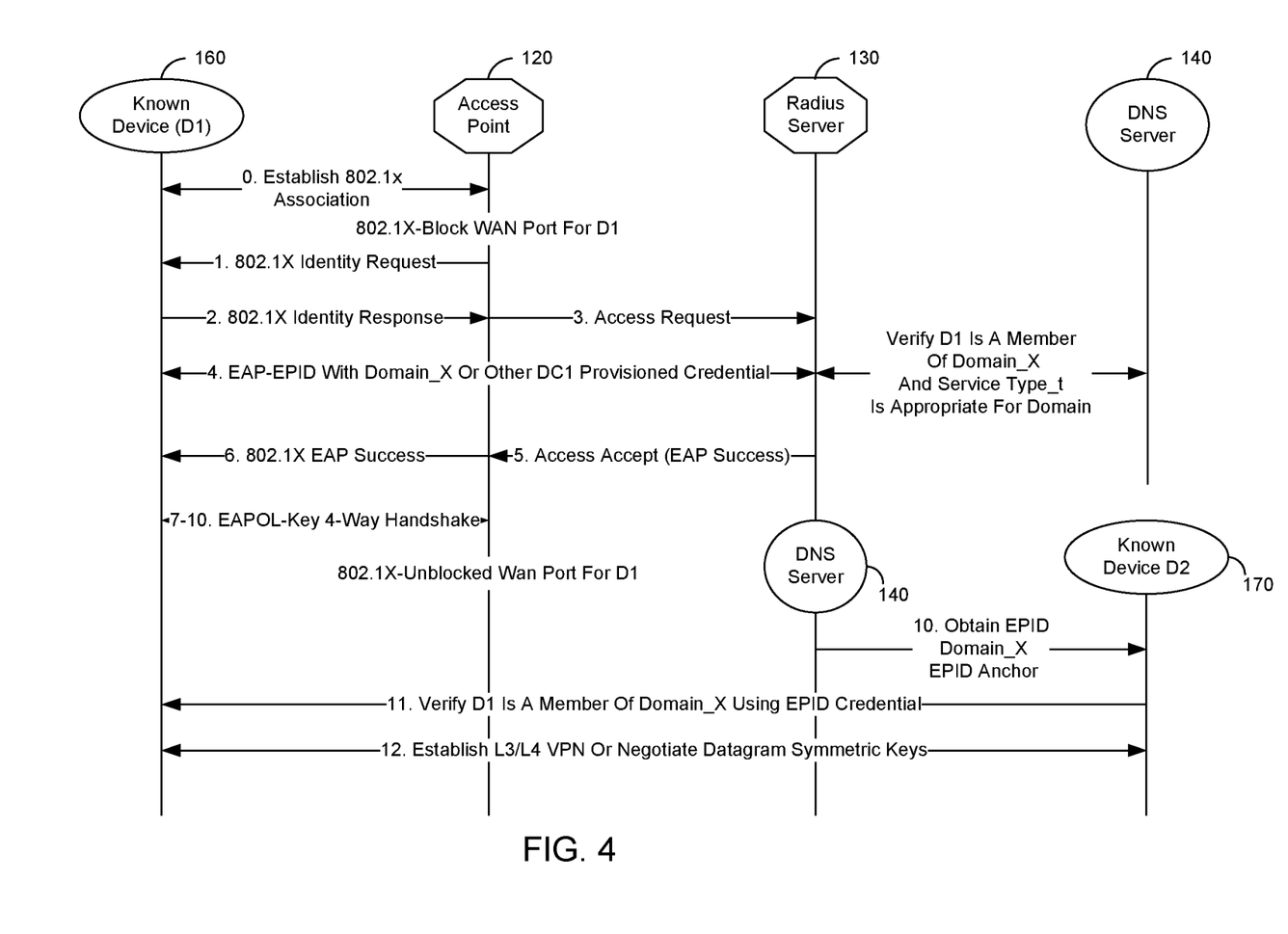
FIG. 4 is a block diagram of a detailed method for enabling a known industrial IoT device to connect securely to a domain network in accordance with one embodiment of the present invention.

Referring now to FIG. 4, shown is a block diagram of a detailed method for enabling a known industrial IoT device to connect securely to a domain network. More specifically, this connection uses domain credentials that assert membership in the domain. As an example, a domain credential that establishes a group context may be used when connecting to a sub-domain and when obtaining IP services. Subsequent to a device being on-boarded and released from quarantine, it may attempt to connect to another on-boarded device, as described in FIG. 3. A DANE DNS request, in addition to supplying the IPv6 DNS name to IP address translation, verifies the provisioned device credential (e.g., a EPID resulting from a JoinP process during on-boarding), ensuring devices are members of an expected IoT network domain.

As illustrated in FIG. 4, after 802.1x association and blocking of a WAN port for the device, various interactions occur, e.g., in an industrial IoT use case to perform an identity request and response, along with an access request, which may result in provisioning with an EPID for the domain or other provisioned credential. Thereafter, an EAPOL key four-way handshake may occur, responsive to which the WAN port for the device is unblocked.

As further illustrated at a later time, another known device may obtain an EPID anchor for the domain from DNS server 140 and thereafter verify that device 160 is a member of the domain, using this EPID credential. Thereafter, these devices may establish, e.g., an L3/L4 VPN or negotiate datagram symmetric keys there between. In one embodiment, such symmetric key negotiation may be according to a given key management capability such as the "Fluffy" key management system (e.g., Fluffy: Simplified Key Exchange for Constrained Environments, draft-hardjono-ace-fluffy-00 (draft IETF Specification Mar. 23, 2015)).

Examples described herein use an EPID as an interesting group signing scheme for joining the on-boarded device to a collection. However, other group signing schemes may be used instead and may have different security and privacy properties. For example, a quantum-safe group signing algorithm may be quantum-safe but may not have the same privacy properties.

Embodiments thus provide a capability to provide a quarantine of an IoT device from a device collection, e.g., from the point of manufacture and from a second owner by a first owner. An 802.1X access point, a L3 and/or L4 VPN, and/or a DANE service collectively may be used to quarantine IoT devices that are not owned or not owned by the expected owner, at different levels of a communication model. In an ownership transfer method as described herein, a device and its owner may be attesting during an on-boarding method before the device is allowed to exit one or more levels of the quarantine. In an example, an EPID Join protocol may be used during an 802.1X and EAP exchange to provision an EPID private key. Embodiments may be included in a variety of systems including IoT gateway devices, IoT endpoint devices, cloud service providers and services systems.

Figure 5:
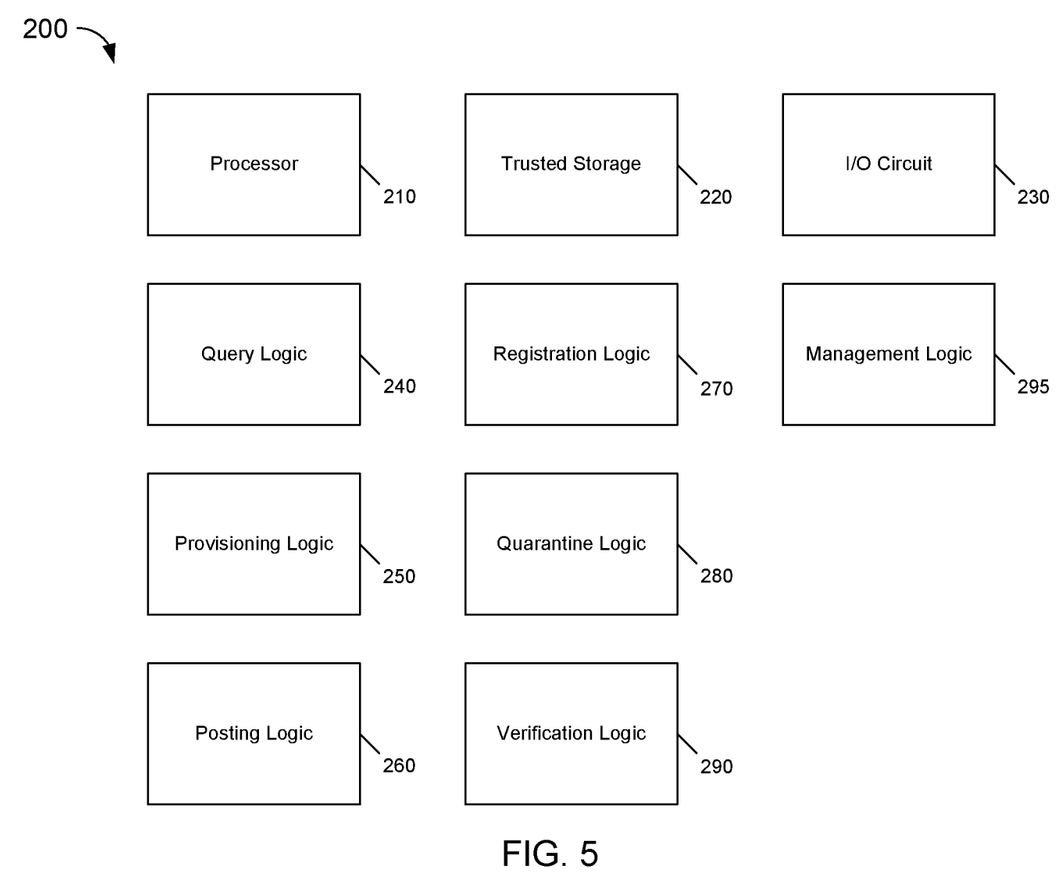
FIG. 5 is a block diagram of a trusted execution environment in accordance with an embodiment of the present invention.

Referring now to FIG. 5, shown is a block diagram of a trusted execution environment in accordance with an embodiment of the present invention. As shown in FIG. 5, TEE 200 may be implemented as all or part of a given integrated circuit. In some cases, TEE 200 may be a stand-alone chip, while in other cases TEE 200 may be a dedicated security engine of an IC, such as a processor or other SoC. In such cases, TEE 200 may operate in a secure manner that is hidden from untrusted hardware and software, including an untrusted OS. Such secure mode provides the TEE that is isolated from non-secure hardware/software/firmware. In example embodiments, a TEE of a device may leverage Intel® Software Guard Extensions (SGX), Intel® Mem-Core, Intel® Converged Security Engine (CSE), Intel® virtualization technology (VT-X), Intel® IOT-OS with Smack, ARM TrustZone, or any other secure environment. In some cases, the TEE may be implemented in a secure co-processor or hardware security module.

In the illustrated embodiment, TEE 200 includes one or more processors 210. Such processors may be implemented in different cases as general-purpose processing cores, dedicated microcontrollers or other particular hardware circuitry. In any case, such processor 210 is implemented as a form of hardware circuitry and is configured to execute in a secure environment, that is, having operation that is hidden from an untrusted remainder of a system. As further illustrated, TEE includes a trusted storage 220. Such trusted storage may store various configuration information, program logic and so forth. In some cases, trusted storage 220 may be implemented as combinations of volatile and persistent storage. In addition, TEE 200 further includes at least one input/output (IO) circuit 230. In different embodiments, IO circuit 230 may be configured to establish a secure connection with one or more remote devices, such as IoT devices to be collected within a domain, as well as other systems, including access points, RADIUS servers, DNS services and so forth. Understand while shown with this particular hardware environment in the embodiment of FIG. 5, many variations and alternatives are possible.

FIG. 5 further illustrates a collection of dedicated hardware logics that may perform various security operations in accordance with the embodiments described herein. Understand while shown separate from processor 210 for ease of illustration, in some cases these dedicated hardware logics may be implemented within processor 210. In other cases, each such dedicated logic may be implemented as a separate hardware circuit. As illustrated, TEE 200 includes a query logic 240, a provisioning logic 250, a posting logic 260, a registration logic 270, a quarantine logic 280 and a verification logic 290, and a manager logic 295. Each of these logics may be configured to perform at least some of the secure on-boarding, domain management, and other operations performed by a domain controller as described herein.

In this regard, query logic 240 may be configured to communicate with an external DNS service among other Internet services, e.g., to determine whether a given unknown device is verifiable as being of a particular type (such that it may be considered for inclusion in a group of devices being controlled within one or more domains by the domain controller). Provisioning logic 250 may be configured to perform provisioning operations to enable an unknown device, when verified to be of a particular type, to be on-boarded into a domain managed by the domain controller. In turn, posting logic 260 may be configured to post anchoring information regarding the domain, such as a public key anchor, to a block chain or other public ledger to establish identification of the domain.

As further illustrated in FIG. 5, registration logic 270 may be configured to register the domain and services of various devices within the domain with one or more Internet services, such as a DNS service. Quarantine logic 280 may be configured to act as a quarantine or enforcement point of a multi-layer remediation network for unrecognized and/or unauthorized devices for a given layer of a multi-layer communication hierarchy. In embodiments described herein, quarantine logic 280 may be configured to be an enforcement point at the L3 and/or L4 layers. A verification logic 290 may be configured to verify credentials of a known device, e.g., responsive to a request from a RADIUS server. Responsive to such verification, the given device may be released from the quarantine point by quarantine logic 280. In addition, a management logic 295 is provided. Such management logic 295 may be configured to perform domain management activities for the owned domain. Such management activities may include the above-described on-boarding as well as removal of domains, interaction with other layers and devices and so forth. Understand while described at this high level in the embodiment of FIG. 5, many variations and alternatives are possible.

As described above, in one embodiment, an EPID Join protocol may be used by a member to interact with the issuer to obtain a unique Intel® EPID private key such that the member's private key is unknown to the issuer. Note that the issuer may authenticate the member through other mechanisms. The join protocol has the following steps, in one embodiment:

1. An authentication server (Issuer) chooses an EPID group for the domain. Let gid be the chosen group ID. Let (gid, h1, h2, w) (where h1 and h2 are elements in G1 and w is an element of G2, used to generate a group public key) be the group public key and (gid, gamma) (where gamma is an integer between [1, p−1] be the group issuing private key. The gid may be chosen to be a 128-bit value corresponding to a subnet. If the subnet mask is shorter it will be padded with zeros.
2. Let NI be a 256-bit nonce chosen by the issuer.
3. The member chooses a random integer f between [1, p−1] or derives f between [1, p−1] from some seed value. This step is out of the scope of this specification.

4. The member runs a JoinP-process to create a join request (F, c, s) (where c and s are integers between [1, p−1]. The JoinP process is specified below.
5. The member sends the join request (F, c, s) to the issuer.
6. The issuer runs the JoinI process to create a membership credential (gid, A, x) (where A is an element of G1 and x is an integer between [1, p−1] for the member). The JoinI process is specified below.
7. The issuer sends the membership credential (gid, A, x) to the member.
8. The member concatenates the membership credential (gid, A, x) received and the f value generated in step 3 into an EPID private key (gid, A, x, f). The member can validate the private key, e.g., as specified by a PKI server.

The details of a JoinP algorithm in accordance with an embodiment of the present invention is specified in Table 1:

TABLE 1

Input
    (gid, h1, h2, w): an EPID group public key
    f: an integer between [1, p−1]
    NI: a 256-bit string
Output
    (F, c, s): a join request
Steps
The following variables F, R (elements of G1), and r, c, s (256-bit integers) are used.
1. The member chooses a random integer r from [1, p−1].
2. The member computes F = G1.sscmExp(h1, f).
3. The member computes R = G1.sscmExp(h1, r).
4. The member computes c =
Fp.hash(p || g1 || g2 || h1 || h2 || w || F || R || NI).
5. The member computes s = (r + c · f) mod p.
6. The output join request is (F, c, s).

The details of a JoinI algorithm in accordance with an embodiment of the present invention is specified in Table 2:

TABLE 2

Input
    (gid, h1, h2, w): an EPID group public key
    (gid, gamma): the issuing private key corresponding to the public key
    NI: a 256-bit string
    (F, c, s): a join request
Output
    (gid, A, x): a membership credential
Steps
The following variables R, t3, A (elements of G1), and nc, x, t1, t2 (256-bit integers) are used.
1. The issuer verifies G1.inGroup(F) is true.
2. The issuer verifies s in [0, p−1].
3. The issuer computes nc = (−c) mod p.
4. The issuer computes R = G1.multiExp(h1, s, F, nc).
5. The issuer verifies c =
Fp.hash(p || g1 || g2 || h1 || h2 || w || F || R || NI).
6. If any of the above verifications fail, the join request is invalid, and the issuer aborts and outputs failure.
7. The issuer chooses x randomly from [1, p−1].
8. The issuer computes integer t1 = (gamma + x) mod p.
9. The issuer computes integer t2 = inverse(t1) mod p, the inverse of t1 modulo p.
10. The issuer computes t3 = G1.mul(g1, F).

Figure 6:
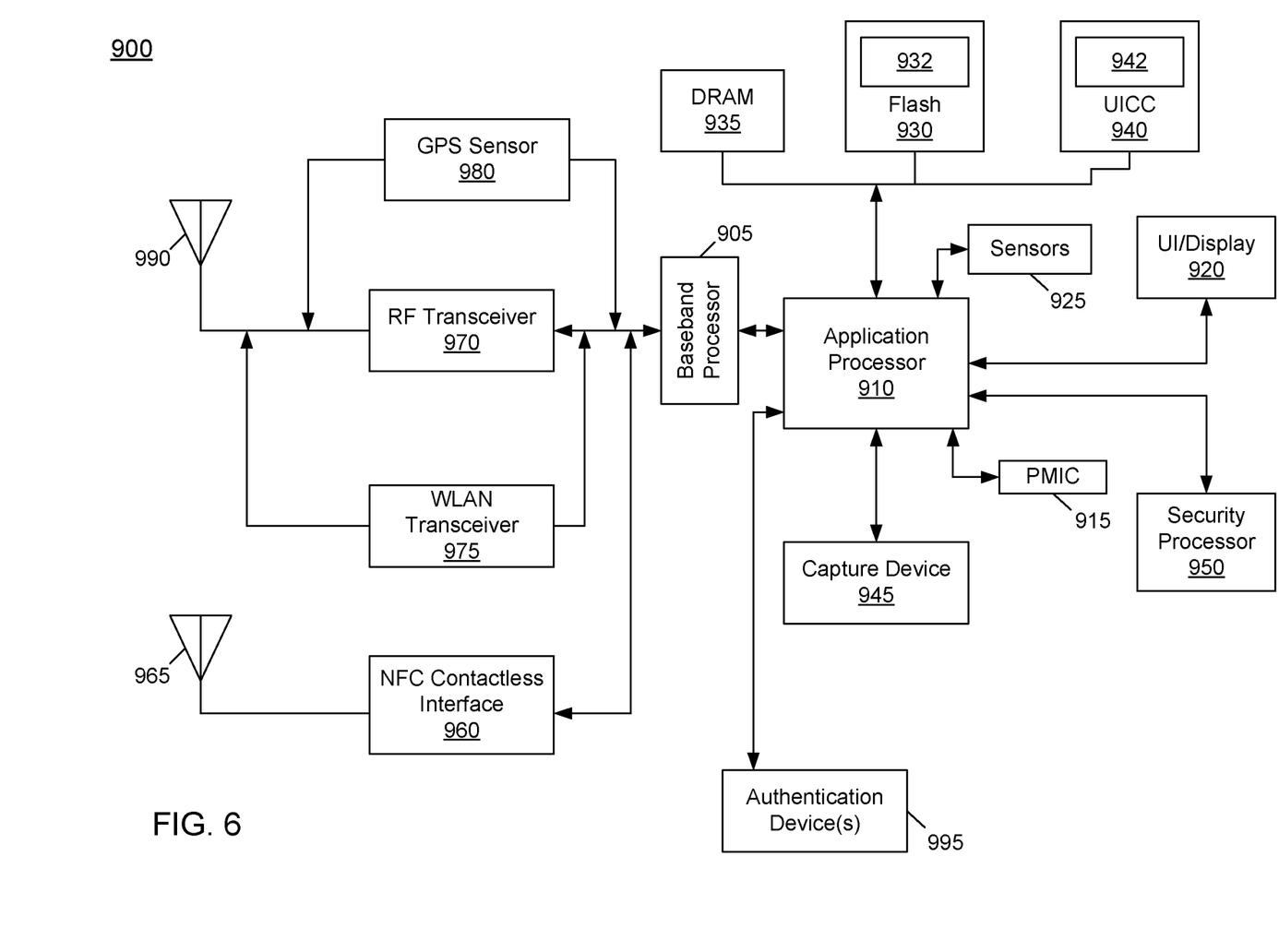
FIG. 6 is a block diagram of an example system with which embodiments can be used.

Referring now to FIG. 6, shown is a block diagram of an example system with which embodiments can be used. System 900 may be an IoT device that can be provisioned into a domain from an unknown state. In other cases system 900 may be a gateway device which may act as an intermediary between a non-IP device and an access point as described herein. In an example, system 900 may be a smartphone or other wireless communicator or any other IoT device. A baseband processor 905 is configured to perform various signal processing with regard to communication signals to be transmitted from or received by the system. In turn, baseband processor 905 is coupled to an application processor 910, which may be a main CPU of the system to execute an OS and other system software, in addition to user applications such as many well-known social media and multimedia apps. Application processor 910 may further be configured to perform a variety of other computing operations for the device.

In turn, application processor 910 can couple to a user interface/display 920, e.g., a touch screen display. In addition, application processor 910 may couple to a memory system including a non-volatile memory, namely a flash memory 930 and a system memory, namely a DRAM 935. In some embodiments, flash memory 930 may include a secure portion 932 in which secrets and other sensitive information may be stored. As further seen, application processor 910 also couples to a capture device 945 such as one or more image capture devices that can record video and/or still images.

Still referring to FIG. 6, a universal integrated circuit card (UICC) 940 comprises a subscriber identity module, which in some embodiments includes a secure storage 942 to store secure user information. System 900 may further include a security processor 950 that may that may implement a TEE, and which may couple to application processor 910. Furthermore, application processor 910 may implement a secure mode of operation, such as Intel® SGX extensions to a given instruction set architecture, and circuitry for hosting of a TEE. Security processor 950 and/or application processor 910 may be configured to perform provisioning on the basis of an included manufacturer certificate, as described herein, to enable system 900 to join a domain and thereafter interact with other devices, e.g., within the domain. A plurality of sensors 925, including one or more multi-axis accelerometers may couple to application processor 910 to enable input of a variety of sensed information such as motion and other environmental information. In addition, one or more authentication devices 995 may be used to receive, e.g., user biometric input for use in authentication operations.

As further illustrated, a near field communication (NFC) contactless interface 960 is provided that communicates in a NFC near field via an NFC antenna 965. While separate antennae are shown in FIG. 6, understand that in some implementations one antenna or a different set of antennae may be provided to enable various wireless functionality.

A power management integrated circuit (PMIC) 915 couples to application processor 910 to perform platform level power management. To this end, PMIC 915 may issue power management requests to application processor 910 to enter certain low power states as desired. Furthermore, based on platform constraints, PMIC 915 may also control the power level of other components of system 900.

To enable communications to be transmitted and received such as in one or more IoT networks, various circuitry may be coupled between baseband processor 905 and an antenna 990. Specifically, a radio frequency (RF) transceiver 970 and a wireless local area network (WLAN) transceiver 975 may be present. In general, RF transceiver 970 may be used to receive and transmit wireless data and calls according to a given wireless communication protocol such as 3G or 4G wireless communication protocol such as in accordance with a code division multiple access (CDMA), global system for mobile communication (GSM), long term evolution (LTE)

or other protocol. In addition a GPS sensor 980 may be present, with location information being provided to security processor 950 for use as described herein when context information is to be used in a pairing process. Other wireless communications such as receipt or transmission of radio signals, e.g., AM/FM and other signals may also be provided. In addition, via WLAN transceiver 975, local wireless communications, such as according to a Bluetooth™ or IEEE 802.11 standard can also be realized.

Figure 7:
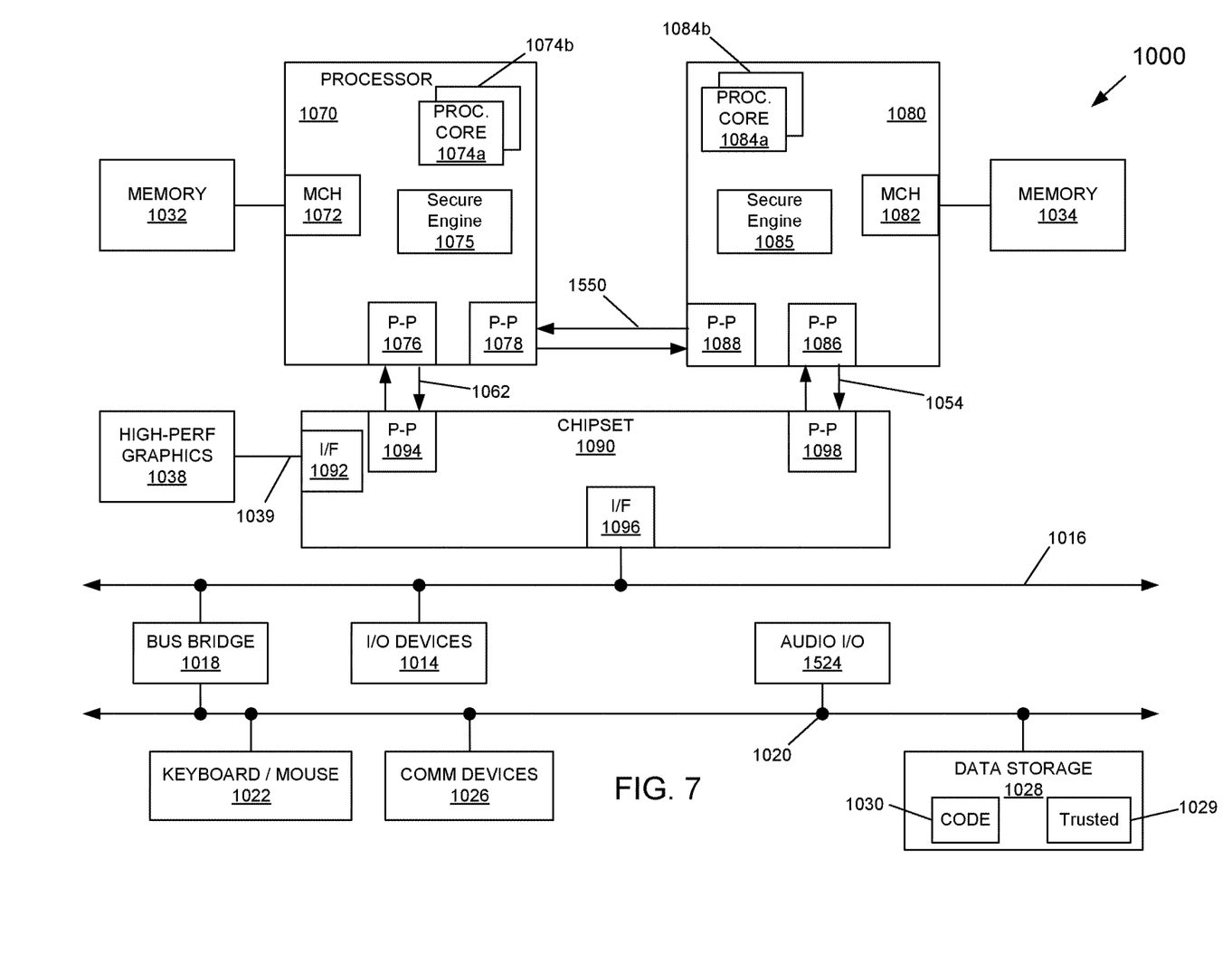
FIG. 7 is a block diagram of a system in accordance with another embodiment of the present invention.

Referring now to FIG. 7, shown is a block diagram of a system in accordance with another embodiment of the present invention. As shown in FIG. 7, multiprocessor system 1000 is a point-to-point interconnect system such as a server system, and includes a first processor 1070 and a second processor 1080 coupled via a point-to-point interconnect 1050. In an embodiment, system 1000 may be a domain controller or a DNS server, depending on implementation. As shown in FIG. 7, each of processors 1070 and 1080 may be multicore processors such as SoCs, including first and second processor cores (i.e., processor cores 1074a and 1074b and processor cores 1084a and 1084b), although potentially many more cores may be present in the processors. In addition, processors 1070 and 1080 each may include a secure engine 1075 and 1085 to perform domain processing and management, and/or DNS services as described herein, among other operations.

Still referring to FIG. 7, first processor 1070 further includes a memory controller hub (MCH) 1072 and point-to-point (P-P) interfaces 1076 and 1078. Similarly, second processor 1080 includes a MCH 1082 and P-P interfaces 1086 and 1088. As shown in FIG. 7, MCH's 1072 and 1082 couple the processors to respective memories, namely a memory 1032 and a memory 1034, which may be portions of main memory (e.g., a DRAM) locally attached to the respective processors. First processor 1070 and second processor 1080 may be coupled to a chipset 1090 via P-P interconnects 1052 and 1054, respectively. As shown in FIG. 7, chipset 1090 includes P-P interfaces 1094 and 1098.

Furthermore, chipset 1090 includes an interface 1092 to couple chipset 1090 with a high performance graphics engine 1038, by a P-P interconnect 1039. In turn, chipset 1090 may be coupled to a first bus 1016 via an interface 1096. As shown in FIG. 7, various input/output (I/O) devices 1014 may be coupled to first bus 1016, along with a bus bridge 1018 which couples first bus 1016 to a second bus 1020. Various devices may be coupled to second bus 1020 including, for example, a keyboard/mouse 1022, communication devices 1026 and a data storage unit 1028 such as a non-volatile storage or other mass storage device. As seen, data storage unit 1028 may include code 1030, in one embodiment. As further seen, data storage unit 1028 also includes a trusted storage 1029 to store sensitive information to be protected. Further, an audio I/O 1024 may be coupled to second bus 1020.

Figure 8:
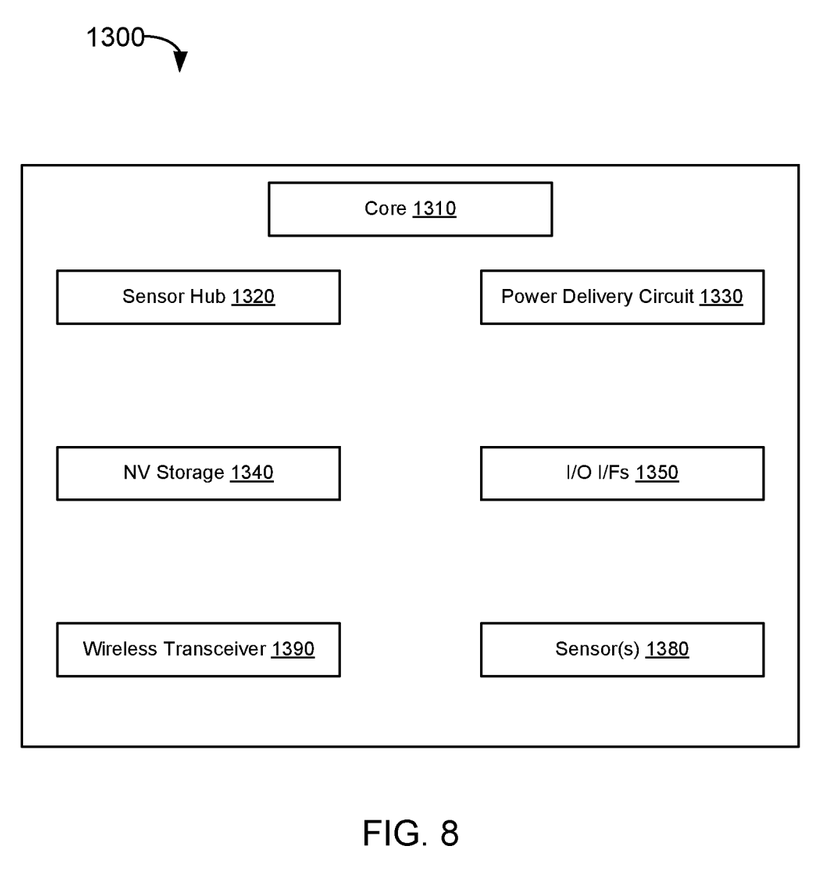
FIG. 8 is a block diagram of a system in accordance with another embodiment of the present invention

Embodiments may be used in environments where IoT devices may include wearable devices or other small form factor IoT devices. Referring now to FIG. 8, shown is a block diagram of a wearable module 1300 in accordance with another embodiment. In one particular implementation, module 1300 may be an Intel® Curie™ module that includes multiple components adapted within a single small module that can be implemented as all or part of a wearable device. Module 1300 may be configured with a manufacturer credential during factory operations, to thereafter enable the device to be included in a domain, via interaction through an access point and/or gateway device as described herein. As seen, module 1300 includes a core 1310 (of course in other embodiments more than one core may be present). Such core may be a relatively low complexity in-order core, such as based on an Intel Architecture® Quark™ design. In some embodiments, core 1310 may implement a TEE as described herein. Core 1310 couples to various components including a sensor hub 1320, which may be configured to interact with a plurality of sensors 1380, such as one or more biometric, motion, environmental or other sensors. A power delivery circuit 1330 is present, along with a non-volatile storage 1340. In an embodiment, this circuit may include a rechargeable battery and a recharging circuit, which may in one embodiment receive charging power wirelessly. One or more input/output (IO) interfaces 1350, such as one or more interfaces compatible with one or more of USB/SPI/I²C/GPIO protocols, may be present. In addition, a wireless transceiver 1390, which may be a Bluetooth™ low energy or other short-range wireless transceiver is present to enable wireless communications as described herein. Understand that in different implementations a wearable module can take many other forms. Wearable and/or IoT devices have, in comparison with a typical general purpose CPU or a GPU, a small form factor, low power requirements, limited instruction sets, relatively slow computation throughput, or any of the above.

The following Examples pertain to further embodiments.

In Example 1, a system comprises: an access point having at least one first hardware processor, the access point comprising a first layer of a remediation network, the remediation network to prevent network access by unknown devices; a first server coupled to the access point, the first server having at least one second hardware processor, the first server to verify that a first unknown device is trusted based at least in part on a manufacturer credential of the first unknown device, the manufacturer credential to indicate a type of device; and a domain controller coupled to the first server, the domain controller having at least one third hardware processor, the domain controller to manage a domain, the domain controller to communicate with the first server to provision the first unknown device into the domain, where the domain controller comprises a second layer of the remediation network and responsive to the provisioning of the first unknown device into the domain, the first unknown device is to be released from the first layer of the remediation network.

In Example 2, the domain controller is further to communicate with the first server to verify a set of credentials, to enable the first unknown device to join the domain and establish the first unknown device as a known device.

In Example 3, the domain controller of Example 2 is, responsive to verification of the set of credentials, to issue a second credential to the first unknown device, the second credential comprising a group private key, where a message signed by the group private key is to be verified by a group public key for the domain.

In Example 4, responsive to establishment of an association between the first unknown device and the access point, the access point is to enable communication of a provisioning request to a DNS server to enable the first unknown device to obtain an identification of the domain controller.

In Example 5, the DNS server of Example 4 is to maintain a registry of active domains including the domain, and to indicate, responsive to a request from a device, whether another device is a member of an active domain.

In Example 6, the system further comprises a gateway device coupled to the access point, the gateway device comprising a third layer of the remediation network, where the gateway device is to enable the first unknown device to communicate with the access point, where the first unknown device comprises a non-Internet protocol device.

In Example 7, the domain controller of one or more of the above Examples is to register the first device with the DNS server, to indicate that the first device is a member of the domain and, responsive to registration of the first device with the DNS server, remove the first device from the second quarantine point.

In Example 8, the domain controller of one or more of the above Examples comprises a trusted execution environment including a provisioning logic, a quarantine logic and a management logic.

In Example 9, a method comprises: receiving, in a domain controller of a domain managed by the domain controller, a request from a first device to join the domain, the domain controller comprising a first quarantine point at a first layer of a multi-layer communication model; communicating with a DNS server to determine whether the first device is a first device type, based at least in part on a manufacturer certificate for the first device; based on the determination, verifying that the first device is authorized to be a member of the domain and communicating the verification to a second server coupled to the domain controller; and, responsive to an authentication protocol performed between the second server and the first device, removing the first device from a second quarantine point at a second layer of the multi-layer communication model, where the second layer is a lower layer of the multi-layer communication model than the first layer, the second quarantine point more restrictive than the first quarantine point. Note that by being more restrictive, it is meant that the range of possible reachable IoT devices is fewer.

In Example 10, the method further comprises self-asserting, via the domain controller, a name for the domain and registering the domain with the DNS server based at least in part on a group public key, the name independent of an Internet protocol network naming convention.

In Example 11, the method further comprises provisioning a group private key for the first device responsive to removal of the first device from the second quarantine point.

In Example 12, the method further comprises registering the first device with the DNS server, to indicate that the first device is a member of the domain.

In Example 13, the method of Example 12 further comprises, responsive to registration of the first device with the DNS server, removing the first device from the second quarantine point.

In Example 14, the method of one or more of the above Examples further comprises providing a public key for the domain to a block chain service, the block chain service comprising a ledger for transfer of ownership of one or more devices including the first device to the domain.

In another example, a computer readable medium including instructions is to perform the method of any of the above Examples.

In another example, a computer readable medium including data is to be used by at least one machine to fabricate at least one integrated circuit to perform the method of any one of the above Examples.

In another example, an apparatus comprises means for performing the method of any one of the above Examples.

In Example 15, a domain controller comprises: a quarantine logic to quarantine unknown devices from unrestricted network access, the quarantine logic comprising a first quarantine point at a first layer of a multi-layer communication model; a first logic to communicate with a DNS service to self-allocate and register a domain name with the DNS service, the domain name associated with a domain to be managed by the domain controller; a second logic to manage a group of devices of the domain; and a third logic to receive a provisioning request for a first device via an access point, where the access point comprises a second quarantine point at a second layer of the multi-level communication model.

In Example 16, the third logic is to verify a device type of the first device with the DNS service.

In Example 17, the third logic is, responsive to verification that the first device is of a first device type, to provision the first device into the domain.

In Example 18, the third logic is to send a provisioning response to the access point to enable the first device to be removed from the second quarantine point, to enable the first device to communicate with the domain controller.

In Example 19, the third logic is to provision a first group private key for the first device and provide the first group private key to the first device, the first group private key associated with a group public key for the domain, the group public key further provided from the domain controller to a block chain provider for storage in a block chain ledger.

In Example 20, the domain controller of one or more of the above Examples further comprises a fourth logic to provide a public key for the domain to a block chain service, the block chain service comprising a ledger for transfer of ownership of one or more devices including the first device to the domain.

In Example 21, a controller comprises: quarantine means for quarantining unknown devices from unrestricted network access, the quarantine means comprising a first quarantine point at a first layer of a multi-layer communication model; means for communicating with a DNS service to self-allocate and register a domain name with the DNS service, the domain name associated with a domain to be managed by the controller; means for managing a group of devices of the domain; and provisioning means for receiving a provisioning request for a first device via an access point, where the access point comprises a second quarantine point at a second layer of the multi-level communication model.

In Example 22, the provisioning means is to verify a device type of the first device with the DNS service.

In Example 23, the provisioning means is to: responsive to verification that the first device is of a first device type, provision the first device into the domain; and thereafter send a provisioning response to the access point to enable the first device to be removed from the second quarantine point, to enable the first device to communicate with the controller.

Understand that various combinations of the above Examples are possible

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. At least one computer readable storage medium comprising instructions that when executed enable a system to:
   receive, in a domain controller of a domain managed by the domain controller, a request from a first device to join the domain, the domain controller comprising a first quarantine point at a first layer of a multi-layer communication model;
   communicate with a domain name system (DNS) server to determine whether the first device is a first device type, based at least in part on a manufacturer certificate for the first device; and
   based on the determination, verify that the first device is authorized to be a member of the domain and communicate the verification to a second server coupled to the domain controller, wherein responsive to an authentication protocol performed between the second server and the first device, the first device is to be removed from a second quarantine point at a second layer of the multi-layer communication model, wherein the second layer is a lower layer of the multi-layer communication model than the first layer, the second quarantine point is more restrictive than the first quarantine point.

2. The at least one computer readable medium of claim 1, further comprising instructions that when executed enable the domain controller to self-assert a name for the domain and register the domain with the DNS server based at least in part on a group public key, the name independent of an Internet protocol network naming convention.

3. The at least one computer readable medium of claim 2, further comprising instructions that when executed enable the domain controller to provision a group private key for the first device responsive to removal of the first device from the second quarantine point.

4. The at least one computer readable medium of claim 1, further comprising instructions that when executed enable the domain controller to register the first device with the DNS server, to indicate that the first device is a member of the domain.

5. The at least one computer readable medium of claim 4, further comprising instructions that when executed enable the domain controller to, responsive to registration of the first device with the DNS server, remove the first device from the first quarantine point.

6. The at least one computer readable medium of claim 1, further comprising instructions that when executed enable the domain controller to provide a public key for the domain to a block chain service, the block chain service comprising a ledger for transfer of ownership of one or more devices including the first device to the domain.

7. The at least one computer readable medium of claim 1, further comprising instructions that when executed enable the domain controller to, by default, hold unknown devices in the first quarantine point at the first layer of the multi-layer communication model.

8. The at least one computer readable medium of claim 7, wherein unknown devices comprise devices that are not members of the domain managed by the domain controller.

9. The at least one computer readable medium of claim 1, wherein the instructions, when executed, enable the domain controller to communicate with the DNS server to determine that the first device has the given device type, in response to receiving the request from the first device to join the domain.

10. A domain controller comprising logic which enables the domain controller to:
    hold unknown devices in a first quarantine point at a first layer of a multi-layer communication model;
    receive, from a device, a request to join a domain managed by the domain controller;
    in response to receiving the request to join the domain, communicate with a domain name system (DNS) server to determine that the device has a given device type, based at least in part on a manufacturer certificate for the device;
    in response to determining that the device has a given device type, verify that the device is authorized to be a member of the domain and communicate the verification to a second server, to cause the second server to complete an authentication protocol with the device and, in response to completion of the authentication protocol, remove the device from a second quarantine point at a second layer of the multi-layer communication model, wherein the second layer is a lower layer of the multi-layer communication model than the first layer, and the second quarantine point is more restrictive than the first quarantine point.

11. The domain controller of claim 10, further comprising logic which enables the domain controller to self-assert a name for the domain and register the domain with the DNS server based at least in part on a group public key, wherein the name is independent of an Internet protocol network naming convention.

12. The domain controller of claim 10, further comprising logic which enables the domain controller to provision a group private key for the device, responsive to removal of the device from the second quarantine point.

13. The domain controller of claim 10, further comprising logic which enables the domain controller to register the device with the DNS server, to indicate that the device is a member of the domain.

14. The domain controller of claim 13, further comprising logic which enables the domain controller to remove the device from the first quarantine point, responsive to registration of the device with the DNS server as member of the domain.

15. The domain controller of claim 10, further comprising logic which enables the domain controller to provide a public key for the domain to a block chain service, wherein the block chain service comprises a ledger for transfer of ownership of devices to the domain.

16. The domain controller of claim 10, wherein unknown devices comprise devices that are not members of the domain managed by the domain controller.

17. The domain controller of claim 10, further comprising logic which enables the domain controller to:
   verify credentials of the device; and
   responsive to verification of the credentials, remove the device from the first quarantine point.

18. A method for managing a domain, the method comprising:
   at a domain controller that manages a domain that uses a multi-layer communication model, holding devices that are not members of the domain in a first quarantine point at a first layer of the multi-layer communication model;
   at the domain controller, receiving, from a device, a request to join the domain;
   in response to receiving the request to join the domain, communicating with a domain name system (DNS) server to determine that the device has a given device type, based at least in part on a manufacturer certificate for the device;
   in response to determining that the device has a given device type, verifying that the device is authorized to be a member of the domain and communicating the verification to a second server, to cause the second server to complete an authentication protocol with the device and, in response to completion of the authentication protocol, remove the device from a second quarantine point at a second layer of the multi-layer communication model, wherein the second layer is a lower layer of the multi-layer communication model than the first layer, and the second quarantine point is more restrictive than the first quarantine point.

19. A method according to claim 18, further comprising:
   registering the device with the DNS server, to indicate that the device is a member of the domain; and
   after registering the device with the DNS server as member of the domain, removing the device from the first quarantine point.

20. A method according to claim 18, further comprising:
   providing a public key for the domain to a block chain service, wherein the block chain service comprises a ledger for transfer of ownership of devices to the domain.

* * * * *